United States Patent
Jerebko et al.

(10) Patent No.: US 10,445,904 B2
(45) Date of Patent: Oct. 15, 2019

(54) METHOD AND DEVICE FOR THE AUTOMATIC GENERATION OF SYNTHETIC PROJECTIONS

(71) Applicant: SIEMENS HEALTHCARE GMBH, Erlangen (DE)

(72) Inventors: Anna Jerebko, Hausen (DE); Andreas Fieselmann, Erlangen (DE); Christoph Luckner, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 15/684,499

(22) Filed: Aug. 23, 2017

(65) Prior Publication Data

US 2018/0061090 A1 Mar. 1, 2018

(30) Foreign Application Priority Data

Aug. 23, 2016 (DE) .................. 10 2016 215 831

(51) Int. Cl.
*G06T 11/00* (2006.01)
(52) U.S. Cl.
CPC .......... *G06T 11/005* (2013.01); *G06T 11/008* (2013.01); *G06T 2210/41* (2013.01)
(58) Field of Classification Search
CPC combination set(s) only.
See application file for complete search history.

(56) References Cited

U.S. PATENT DOCUMENTS

| 5,852,646 A * | 12/1998 | Klotz | G06T 11/008 378/8 |
| 2006/0002509 A1* | 1/2006 | Claus | G06T 11/005 378/21 |
| 2007/0052700 A1* | 3/2007 | Wheeler | G06T 7/0012 345/419 |
| 2012/0045105 A1* | 2/2012 | Engel | A61B 6/032 382/131 |
| 2013/0094742 A1* | 4/2013 | Feilkas | A61B 6/584 382/131 |

(Continued)

FOREIGN PATENT DOCUMENTS

WO 2016078958 A1 5/2016

OTHER PUBLICATIONS

Xun Jia, et al; "GPU-based high-performance computing for radiation therapy"; Physics in Medicine & Biology; Feb. 3, 2014; vol. 59, No. 4; Institute of Physics and Engineering in Medicine; IOP Publishing.

(Continued)

*Primary Examiner* — Tsung Yin Tsai
(74) *Attorney, Agent, or Firm* — Laurence Greenberg; Werner Stemer; Ralph Locher (57) ABSTRACT

A method for the automatic generation of synthetic projections of an examination object from at least one three-dimensional data set acquired by way of a medical imaging system. The three-dimensional data set is used as a basis for determining position information relating to the arrangement of structures of the examination object and at least one synthetic projection based on the position information. We also describe a projection-image-ascertaining facility for the automatic generation of synthetic projections and a computer program product for executing the method.

20 Claims, 5 Drawing Sheets

(56) References Cited

U.S. PATENT DOCUMENTS

2015/0238148 A1* 8/2015 Georgescu .......... A61B 5/7267
                                                        600/408

OTHER PUBLICATIONS

Craig Hacking, et al.; "Ankle series"; Radiopaedia.org; http://radiopaedia.org/articles/ankle-series.
Frank Gaillard, et al; "Scoliosis"; Radiopaedia.org; http://radiopaedia.org/articles/scoliosis.
R. Schmitt, et al.; "Imaging of Scaphoid Fractures According to the New S3 Guidelines"; Georg Thieme Verlag KG Stuttgart; DOI: 10.1055/s-0042-104660; https://www.thieme-connect.com/products/ejournals/pdf/10.1055/s-0042-104660.pdf.
Fitsum A. Reda, et al.; "Sparse appearance model-based algorithm for automatic segmentation and identification of articulated hand bones"; Siemens Medical Solutions, Malvern, PA, Dept. of Electrical Engineering and Computer Science, Vanderbilt University, Nashville.
Andrew Murphy, et al.; "Scaphoid series"; Radiopaedia.org; http://radiopaedia.org/articles/scaphoid-series.

* cited by examiner

METHOD AND DEVICE FOR THE AUTOMATIC GENERATION OF SYNTHETIC PROJECTIONS

CROSS-REFERENCE TO RELATED APPLICATION

This application claims the benefit, under 35 U.S.C. § 119, of German patent application DE 10 2016 215 831.7, filed Aug. 23, 2016; the prior application is herewith incorporated by reference in its entirety.

BACKGROUND OF THE INVENTION

Field of the Invention

The invention relates to a method for the at least semi-automatic, preferably fully-automatic, generation of synthetic projections of an examination object from at least one three-dimensional data set, i.e. a volume image data set, acquired by means of a medical imaging system. The invention also relates to a corresponding projection-image-ascertaining facility that is able to work in accordance with this method.

At present, two-dimensional radiographic images, for example simple X-ray images are still very frequently used in the context of imaging for orthopedic purposes and/or during the treatment of accident victims. Compared to 3D tomography images, i.e. volume image data, as they were called above, these have the drawback that often diverse anatomic structures are superimposed in the images. However, they do have the advantage that, as a rule, they enable a quicker overview of the region of interest. Moreover, to date, in many cases they are also available more quickly than three-dimensional data sets that to date generally require data acquisition in computer tomography images, magnetic resonance images or the like. However, in the meantime it is now also possible to use robotic X-ray scanners (such as, for example, the Multitom Rax® or Artis Zeego® (registered trademarks of Siemens Healthcare) for the acquisition of suitable volume image data or three-dimensional data sets. Such X-ray scanners also enable data to be obtained relatively quickly, particularly as, due to their suitability for universal use for the acquisition of three-dimensional data-sets and two-dimensional radiographic images and because of the lower costs compared to CT systems and MRI systems, such devices (which generally have a simple cone-beam X-ray source) are increasingly used in hospitals and clinical practices and are therefore often more readily available.

Once such a three-dimensional data set of an examination object, for example a hand, an ankle etc., is available, it is possible to generate synthetic projections from this three-dimensional data set, wherein said synthetic projections have the same appearance as corresponding two-dimensional radiographic images. Such synthetic projections are frequently also called DRR images (DRR=digitally reconstructed radiographs). Herein it is possible, to compile synthetic projections with both a cone-beam projection and a parallel-beam projection.

The advantage of such synthetic projections can be considered to be that, like conventional two-dimensional radiographic images, they frequently permit a quicker interpretation of tomography images. In addition, many radiologists, who, due to the more frequent use, are more familiar with 2D radiographic images than three-dimensional data sets, find it easier to identify specific features, in particular specific typical lesions such as bone fractures, etc. In some cases, it is also easier to scan anatomic structures, for example, in that the synthetic projection is generated such that it corresponds to a parallel-beam projection. It is also easier to compare such DRR images with, for example, two-dimensional radiographic images of the same examination object that have been compiled previously or subsequently.

However, the compilation of such synthetic projections also requires the definition of projection-geometry parameters, for example to define the distance between a (virtual) source and (virtual) image detector and the orientation of the detector relative to the source and the orientation of the source and detector relative to the examination object. If the projection-geometry parameters are not well matched to the three-dimensional data set, the synthetic projections are not optimal, thus corresponding to a faulty setting with a conventional two-dimensional radiographic image. The optimal selection of projection-geometry parameters is in particular advisable for comparison with two-dimensional projection images for outcome monitoring following operations and/or for monitoring the progress of the healing process. For example, in the case of bone fractures, frequently three-dimensional image data is acquired with the aid of a CT device, MRT device or the aforementioned X-ray scanners (such as the Multitom Rax) before an operation. For monitoring purposes after the operation, only conventional two-dimensional X-ray images are then recorded for comparison with the three-dimensional data set. It is then necessary to generate corresponding synthetic projections from the three-dimensional data set, wherein the projection geometry of said synthetic projections is in conformity with these control images.

At present, the projection-geometry parameters, in particular the projection direction, are generally selected manually by the diagnosing practitioner. The entire process is relatively time-consuming and the quality and speed are heavily dependent upon the experience of the respective diagnosing practitioner.

SUMMARY OF THE INVENTION

It is accordingly an object of the invention to provide a method and a projection image generating apparatus which overcome the above-mentioned and other disadvantages of the heretofore-known devices and methods of this general type and to provide a simpler method for the generation of synthetic projections and a projection-image-ascertaining facility suitable for this purpose.

With the foregoing and other objects in view there is provided, in accordance with the invention, a method of automatically generating synthetic projections of an examination object from at least one three-dimensional data set acquired by a medical imaging system, the method comprising:

ascertaining position information relating to an arrangement of structures of the examination object based on the three-dimensional data set; and ascertaining at least one synthetic projection of the examination object based on the position information.

In other words, first, position information relating to the arrangement of (anatomic) structures of the examination object is ascertained based on the three-dimensional data set. The position information ascertained in this way is then in turn used as the basis for the ascertainment of the synthetic projections or plurality of synthetic projections. Herein, the position information can comprise precise information on the position of the examination object within the three-dimensional data set, i.e. so that the orientation within the data set of the examination object or specific structures within the examination object, such as, for example, bones etc., is precisely known. However, herein, this can in principle also entail very simple information, such as, for example, only information as to whether a synthetic projection corresponds to an optimal position. Different possibilities for obtaining position information will be explained in more detail below. Herein, it is also possible for a plurality of synthetic projections with different projection directions to be generated from a three-dimensional data set.

The method in particular has the advantage that the examination object can be oriented in any way within the three-dimensional data set since it is also possible for the optimal determination of the virtual projections to be performed automatically based on the content of the three-dimensional data set. Herein, this approach can be adopted completely independently of any further information, such as, for example, metadata on the position of the examination object in a real area, for example on an examination table etc.

The invention increases the usefulness of three-dimensional images in everyday clinical practice since, in particular with a robotic X-ray scanner such as, for example the Multitom Rax® or Artis Zeego® (Siemens), no more time is required on a first recording, even in "non-critical" medical cases, for the acquisition of one three-dimensional data set than for the complex generation of two-dimensional radiographic images from three or four different directions since even two-dimensional images require precise positioning of the device. As will be demonstrated later, it is possible in a very simple way to replace the previously usual standard settings for two-dimensional radiographic images, which are otherwise carried out on a initial examination in order to verify a specific diagnosis, by corresponding synthetic projections that can then be very quickly generated by the semi- or fully-automatic method from three-dimensional data so that, in many cases, the method is even quicker than the generation of a plurality of two-dimensional radiographic images.

A corresponding projection-image-ascertaining facility requires, on the one hand, an input interface for accepting the three-dimensional data set. It also requires a computing unit for ascertaining position information relating to the arrangement of structures of the examination object based on the three-dimensional data set and for ascertaining at least one synthetic projection based on the position information. Finally, it requires an output interface for outputting the synthetic projections, for example into a memory in which the finished synthetic projections are to be held resident, and/or to an image output unit, such as a screen etc.

The essential components of the projection-image-generating facility according to the invention can be predominately embodied in the form of software components. However, in principle, these components can also be partially—in particular when particularly fast calculations are required—implemented in the form of software-supported hardware, for example FPGAs or the like. Similarly, when only the acceptance of data from other software components is required, it is also possible for the necessary interfaces, to be embodied, for example, as software interfaces. However, they can also be embodied as hardware-based interfaces that are controlled by suitable software.

The projection-image-generating facility according to the invention can, for example, be implemented by means of the suitable software components on a computing facility or computing unit that is per se independent of the medical imaging system with which the three-dimensional data set was generated, for example on a workstation, that accepts the three-dimensional data set (the volume image data), for example via a medical data network, such as a radiological information system (RIS) in a practice or hospital from the imaging system and/or from a memory in which the data set is held resident. However, in principle, the projection-image-generating facility can also be part of a user terminal and/or a computing unit of the medical imaging system (for example in the control facility thereof) itself in order to carry out the method according to the invention or parts thereof directly after the scan. Accordingly, the acquisition of the scan data and the generation of the three-dimensional data set therefrom can also be part of the method.

An extensively software-based implementation has the advantage that it is also possible to retrofit previously used workstations, control devices or user terminals etc. in a simple way by means of a software-update in order to work in the manner according to the invention. Insofar, the object is also achieved by a corresponding computer program product with a computer program, which can be loaded directly into a storage facility of a computing unit (for example a workstation of a medical data network or a control facility of an imaging system) with program segments for carrying out all steps of the method according to the invention when the program is executed in the computing unit. In addition to the computer program, a computer program product can optionally comprise additional parts such as, for example, documentation and/or additional components, also hardware components, such as, for example, hardware keys (dongles etc.) for using the software.

Transportation to the computing unit and/or storage on or in the computing unit take place via a computer-readable medium, for example a memory stick, a hard disk or another kind of transportable or permanently integrated data medium on which the program segments of the computer program that can be read-in and executed by the computing unit are stored. To this end, the computing unit can, for example, comprise one or more interacting microprocessors or the like.

Further particularly advantageous embodiments and developments of the invention may be derived from the dependent claims and the following description, wherein the independent claims of one claim category can also be developed analogously to the dependent claims of another claim category and the features of different exemplary embodiments can be combined to form new exemplary embodiments.

In one preferred variant, first projection-geometry parameters for at least one synthetic projection are ascertained based on the position information and the synthetic projection is then generated based on the three-dimensional data set using the projection-geometry parameters.

Herein, to ascertain the position information, preferably an analysis of the three-dimensional data set with respect to a spatial arrangement of structures of the examination object, for example bones or the like, can be performed. This analysis is then used as the basis for determining the position, in particular the orientation, of the examination object in the three-dimensional data set.

This analysis of the three-dimensional data set can particularly preferably comprise the ascertainment of significant features of the examination object. This analysis can acquire the individual positions of the significant features in space and their positions relative to one another. One example of such significant features is anatomic landmarks.

To this end, preferably segmentation of the anatomic structures in the three-dimensional data set can be performed. If the desired and/or particularly significant anatomic structures, such as, for example, bones, are segmented, the segmented structures can for example be used to ascertain the anatomic landmarks or other significant features, such as midlines and/or midpoints and/or edges and/or corners of individual structures.

Hence, the analysis of the position of the different structures and/or significant features in space relative to one another enables the position of the entire examination object in the three-dimensional data set to be ascertained. Following this, the projection-geometry parameters can be determined in order to generate a synthetic projection from a specific projection direction relative to the examination object or under specific conditions, such as would also be generated as a genuine two-dimensional radiographic image for a diagnostic procedure.

Preferably, at least one reference plane is determined, wherein said reference plane particularly preferably extends through the examination object. This reference plane can, for example, be determined by the analysis of the three-dimensional data set such that it lies in a specific orientation relative to the examination object. One possibility for defining such a reference plane will be described later with reference to a specific exemplary embodiment on a hand. For example, as shown there, a reference plane can be fitted to a plurality special points of the anatomic features ascertained in advance in the analysis of the three-dimensional data set, for example the midpoints of bones or the like.

Then, preferably, projection-geometry parameters can be ascertained so that the synthetic projection has a defined orientation with respect to this reference plane. Herein, a defined orientation should in particular be understood to mean a specific angle that can be defined in advance.

Herein, for a fully-automatic ascertainment of the synthetic projections, the projection geometries can comprise fixed angles, for example 45° or 90° to a reference plane. There is then no need for further operator intervention. In particular, for specific clinical issues, such as for the diagnosis of a wrist fracture, quite specific views relative to the hand are already usual, such as, for example, a dorsal-palmar image, a lateral image, an oblique-radial image and an oblique-ulnar image. Therefore, it is possible for specific angles to be fixed in advance in a control protocol that is also dependent upon the respective clinical issue or task in order to generate such "standard projections" synthetically.

If it is necessary for the position of the examination object to be changed hereby (i.e. for example not the relative position of the hand in the three-dimensional image data set, but the hand position per se, for example from a straight position into an angled position), to this end, it is possible to produce a corresponding number of images with different positions. Therefore, in the context of the invention, also independently of the further evaluation, preferably use is made of different three-dimensional data sets of the examination object acquired in different positions of the examination object, preferably in the same medical imaging system. I.e. first, a first three-dimensional data set is generated in a first position, for example the extended hand position, and then a further three-dimensional data set in a second position, for example an angled position of the hand. It is also possible to adopt more than two different positions.

If a plurality of such three-dimensional data sets is generated, it is possible to define one reference plane for all three-dimensional data sets jointly, for example in accordance with the above-described preferred method, or an individual reference plane for each three-dimensional data set. Then, the different projections, which are usually provided for the diagnosis of a specific trauma or the like, can be defined in the form of fixed angle values relative to this jointly determined reference plane or the specific reference plane determined in each case for the specific three-dimensional data set. Herein, the position relative to the reference plane or in a space defined by said plane and a perpendicular thereto can be expressed in polar coordinates, in particular cylinder coordinates or spherical coordinates, i.e. for example comprise two angles, namely, on the one hand an inclination to the reference plane and, on the other, a rotation about the vertical axis on this reference plane.

In a further variant, it is possible for the diagnosing practitioner to be given the possibility of changing or adjusting the suggested or preset projection-geometry parameters, in particular angles, interactively.

In another preferred method, first, a number or a series of synthetic projections is generated, for example, a relatively high number of synthetic projections from a wide variety of directions, and from these synthetic projections, position information on at least one synthetic projection optimized with respect to specific optimization criteria is ascertained. Therefore, with this variant, the position information can be embodied relatively simply since it only has to contain information as to whether or not a projection entails an optimized position or a position that is optimal with respect to the optimization criterion. This procedure is also possible in an acceptable time since present-day calculation methods also enable synthetic projections to be generated from three-dimensional data sets relatively quickly.

Herein, it is possible to specify different optimization criteria, the use of which can also be staggered, for example such that first a rough direction is specified for the projection direction from which the synthetic projection is to be generated and then, within this rough direction information, an exact projection direction is selected with the lowest possible overlap of different structures thus enabling as much as possible to be identified.

Therefore, with this second method, the optimal projection directions are ascertained based on the image content and the best possible detectability of lesions or identifiability of structures. There are different possibilities available for this.

For example, it is possible that in each case position information is ascertained from the series of synthetic projections with reference to the determination of the entropy of pixel values, in particular intensity values of the individual pixels. It is to be assumed that the best position with the smallest overlap entails the projections with the maximum entropy, as will be demonstrated later with reference to exemplary embodiments.

It is also possible in each case for position information to be ascertained from the synthetic projections with reference to projected edges of the structures in the synthetic projections. The best position, i.e. the smallest overlap of the structures, is achieved when the maximum possible number of edges is depicted. I.e. a metric could be used that determines and adds up all edge lines within the projection images and the image with the most specific edges is an image with a preferred projection direction.

It is also conceivable for position information to be ascertained from the set of synthetic projections with reference to a projection surface of the structures, i.e. a check is performed as to how large the "shadow area" is. The smallest overlap of the structures is present when the largest possible shadow area is formed.

It is also in principle possible to combine the above-named methods in any way, i.e. different optimization methods could be used; in order to generate optimized synthetic projections from different directions or in order to generate an optimal synthetic projection from a direction, various of the above-named optimization criteria are checked and (optionally with suitable weighting) included in the decision as to which synthetic projection is optimal.

Also possible is a combination of the methods in that both an analysis of the three-dimensional data set is performed to obtain the position information and also—based on the image content and the best detectability—the projection-geometry parameters are defined.

For example, this is possible in that, for example, first fixed parameters for a reference plane or the like are defined but these angles are not exactly adhered to, but with the aid of the method, the image content and the best identifiability of the structures are used to perform a fine adjustment in a specific angular range about the first angle defined.

A preferred possibility for finding suitable projection-geometry parameters following analysis of the image content, i.e. also following ascertainment of the position information can also be based on the reduction of the overlapping of different structures, in particular bones, in the synthetic projection. If, for example, as described above, specific structures within the examination object, for example the bones within a hand, are segmented, the segmentation can be used to define an optimization problem with reference to a target function $O(S,P)$ describing the degree of the overlapping in the synthetic projection image under the projection-geometry parameters P. Herein, as described above, the projection-geometry parameters could comprise the distance between the radiation source (virtual) and the recipient of the image (also virtual), the orientation relative to the examination object etc. The optimal projection-geometry parameters $P_{opt}$ are then described by the following equation:

$$P_{opt} = \arg \min_P(O(S,P)) \quad (1)$$

Here, the function $O(S,P)$ can simply indicate how many bone voxels are projected onto a specific detector pixel and then form the negative value of all the pixels on which at least one bone voxel was depicted. This target function or the optimization task can preferably be calculated numerically when the geometry parameters and the segmented structures S, i.e. the individual voxels in the three-dimensional data set, are known.

In a particularly preferred development of the invention, preferred projections or preferred projection-geometry parameters can be ascertained with the aid of a machine learning method independently of the choice of the precise method: however, this applies in particular to a preferred orientation with respect to a reference plane.

In the context of the machine learning method, it is possible to use a database with two-dimensional data sets or volume image data and/or with synthetic projections or further data from reference examination objects. Herein, the examination objects and reference examination objects should be of the same type and optionally also be as similar as possible with respect to various further criteria, i.e. for example with respect to specific diseases, the size of the body parts, the presence of implants, positions of the body part, i.e. for example extended or bent, etc.

Herein, it is, for example, possible for experienced users to use such reference examination objects to select from a plurality of projections one or more particularly optimal projections with respect to particularly good diagnostic capability. Such a selection can also be made from a database of real two-dimensional radiological images, but particularly preferably based on synthetic projections from a three-dimensional data set.

For application with a machine learning method, a diagnosing practitioner can first individually select "by hand" the most suitable projections from a series of cases. When a specific number of images selected as preferable is available, the machine learning method enables the system to offer the best synthetic projection automatically in further diagnostic procedures so that the individual diagnosing practitioner can arrive at optimized images more quickly. Depending upon whether the diagnosing practitioner accepts or corrects the suggested selection, the system can again add to its learning and use this information for the next diagnostic procedure.

Other features which are considered as characteristic for the invention are set forth in the appended claims.

Although the invention is illustrated and described herein as embodied in an automatic generation of synthetic projections, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
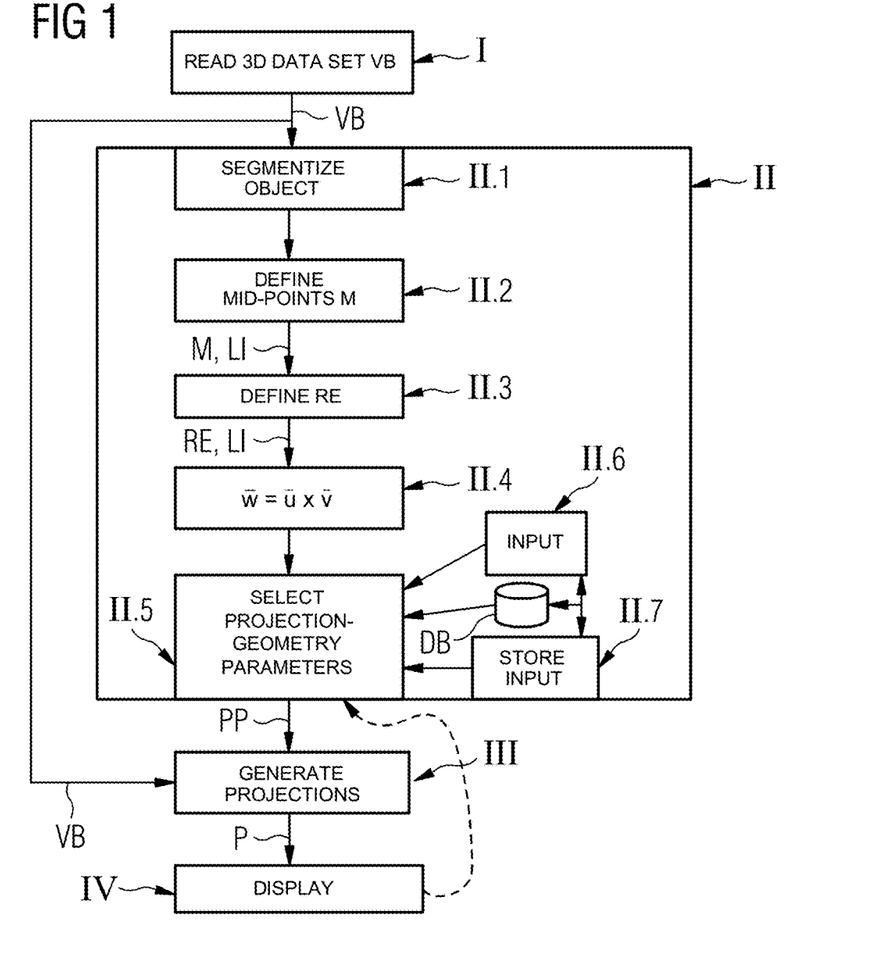
FIG. 1 is a flow chart of a method according to an exemplary embodiment of the invention.
Figure 2:
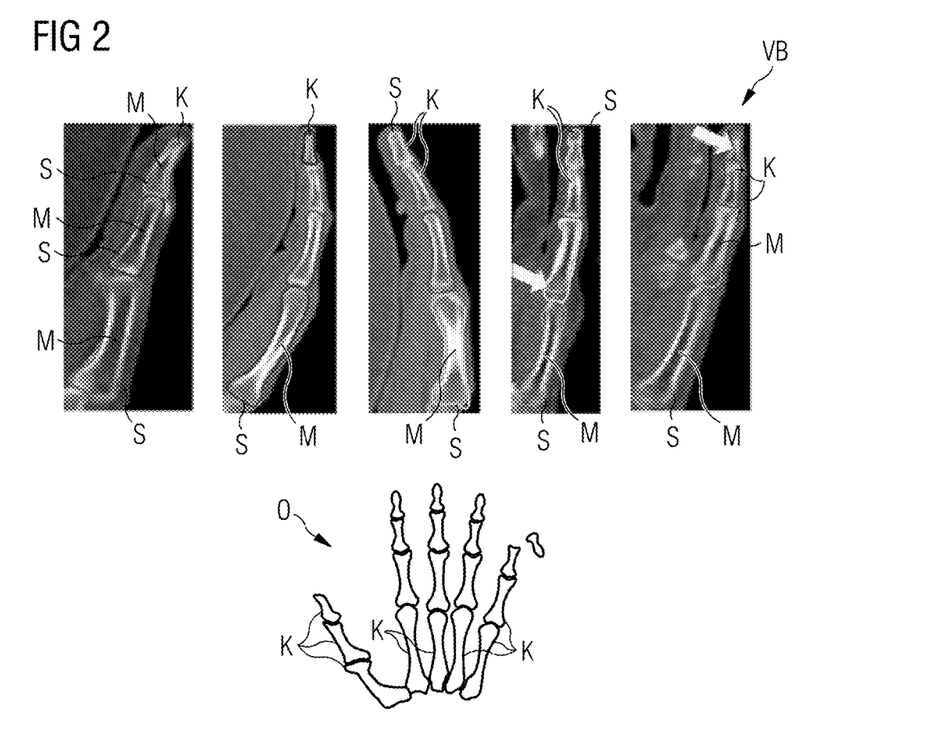
FIG. 2 is a schematic depiction of the bones in a hand and above them in each case sectional images through the individual fingers in a three-dimensional data set of the hand.
Figure 3:
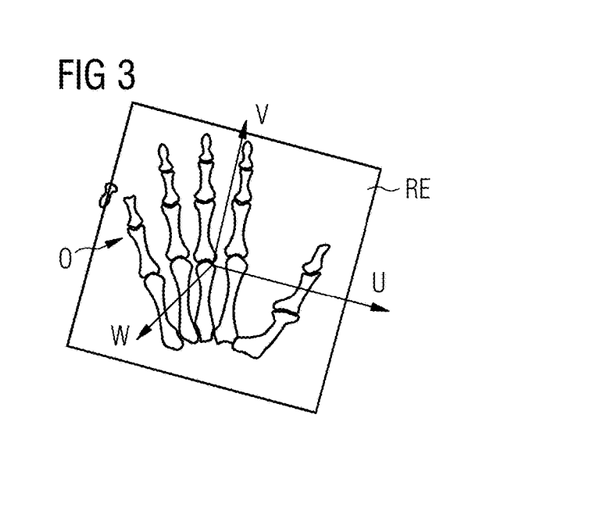
FIG. 3 is a schematic depiction of the definition of a reference plane with respect to a hand.

The following depicts an example of a specific method for the determination of optimal projection-geometry parameters for the generation of synthetic projections of a hand as an examination object O with reference to FIGS. 1 to 3. However, this method is also analogously applicable to other examination objects.

The method starts in Step I with the reading-in of the three-dimensional data set VB, which can be generated by any suitable imaging system, wherein, for example, first raw data is acquired in the usual way and then this raw data is used as the basis for the reconstruction of the three-dimensional data set VB, i.e. the volume image data VB.

In Step II, analysis of the three-dimensional data set VB, as will be explained in further detail below, is used to ascertain optimal projection-geometry parameters PP, so that then, in Step III, these projection-geometry parameters PP and the read-in three-dimensional data set VB are used to generate the desired projections P, which are finally output in Step IV, for example displayed on a screen and/or held resident in a memory.

In Step II, the following part-method steps are performed:

First, in Step II.1, specific structures in the examination object O, i.e. here the bones K in the hand O, are segmented. This is visualized in FIG. 2. Here, the bottom image depicts the finger bones in an extended hand O and above this there are depictions of five sectional images recorded through the individual fingers within the three-dimensional data set VB, wherein from left to right, an individual image is shown for each digit, namely of the thumb on the left, then the index finger, then the middle finger, then finally the ring finger and the little finger on the far right. To symbolize the segmentation S, the outlines of the segmented bones K are shown in the sectional images in each case. Such segmentation S can be performed in any way, for example with the aid of a model-based segmenting method, wherein a anatomical model is matched to the bone structures within the three-dimensional data set VB, but also by means of other methods such as a region-growing-method, a simple threshold-value method or a combination of different methods. Preferably, in the context of the present invention, segmentation is performed fully automatically, i.e. without user intervention being necessary to this end, for example for line marking or the like.

In a further Step II.2 (see FIG. 1 again), the midpoints M within the segmented bones K are then defined, for example, in that, first, in each bone K, a midline along the bone K from one articular (proximal) end to the other articular (distal) end is ascertained and then the midpoint M on this midline is sought. These midpoints M can then be used in the rest of the method as position information LI on the examination object O.

In the method as shown in FIG. 1, in Step II.3, these midpoints M are used to ascertain a reference plane RE as further position information LI for the hand O overall. This is depicted schematically in FIG. 3. For example, to this end, a reference plane RE can be adapted using any fit method to the midpoints M, preferably with a method of least squares deviation. It is then possible, for example, to ascertain the vectors u and v spanning this reference plane RE and additionally from the cross product w=u×v a third vector w standing perpendicular to the reference plane. This calculation of the third vector w is performed in Step II.4. Hence, a unique coordinate system u, v, w is specified with respect to this reference plane RE so that in the following the projection directions can be stated simply in the form of polar coordinates.

The selection of the optimal projection-geometry parameters, i.e. in particular the projection directions in the form of the above-named polar coordinates or angles, is then performed in Step II.5.

This can, on the one hand, take place automatically in that specific standard angles specified for the diagnostic issue in question are taken from a database DB. The user can specify the diagnostic issue in question in Step II.6, for example via a terminal. However, in principle, it can also be input before the examination, before the generation of the three-dimensional data set, and incorporated in an electronic patient record that is called up in Step II.5. Alternatively, in Step II.6, the user can also enter individually chosen angles or other suitable coordinates for the definition of the projection directions or vary the specified values.

Furthermore, in a Step II.7, it is also possible for a user selection input by the user in Step II.6 to be stored, and for it to be ensured in a machine learning method that the system learns from previous user inputs which views are preferably offered to the user under specific conditions, such as, for example, with specific clinical issues and examination objects. Accordingly, it is then possible for such projections to be offered and, if the user corrects the projections, this information is also registered by the system and incorporated in the machine learning method so that the next time other projections are suggested.

The possibility of correcting generated and depicted synthetic projections P by corresponding user inputs is symbolized in FIG. 1 by the dashed arrow returning from Step IV to Step II.5.

Figure 4:
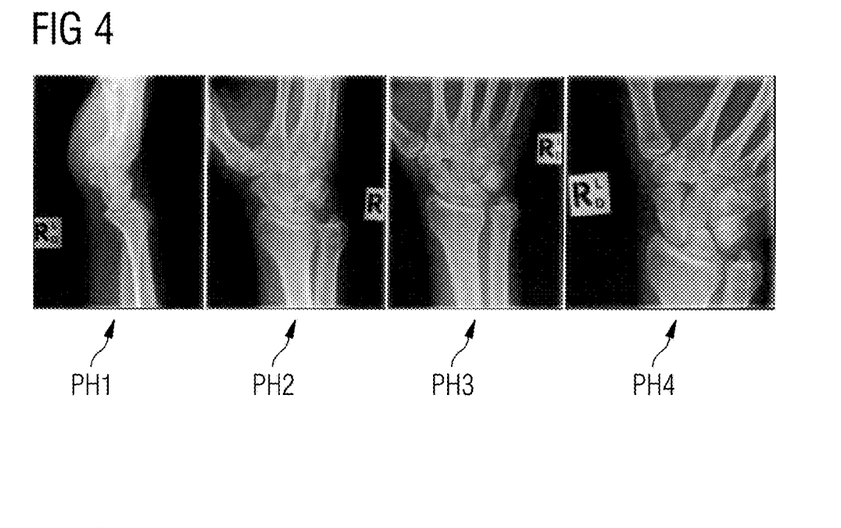
FIG. 4 is an example of four projections of a hand in standard projection directions for a diagnostic procedure with respect to a wrist fracture.

Examples of typical preferred projections PH1, PH2, PH3, PH4 during the examination of a hand to identify a possible wrist fracture are depicted in FIG. 4. The left image shows a projection PH1 in the lateral direction through the wrist, the image to the right of this shows an oblique projection PH2 and the next image on the right shows a pa-projection PH3 (pa=posterior-anterior, corresponding to dorsal-palmar in a hand). The image on the far right shows an ulnar projection PH4, but with an angled hand. To generate this projection PH4, it is necessary to acquire further raw data, namely in the angled position of the hand. For example, to this end, it is possible to acquire two three-dimensional data sets is swift succession, one with a splayed hand and one with an extended hand and one with an angled hand in order to prepare all projections which are required as standard or which may be additionally required by the diagnosing practitioner to confirm the diagnosis.

Figure 5:
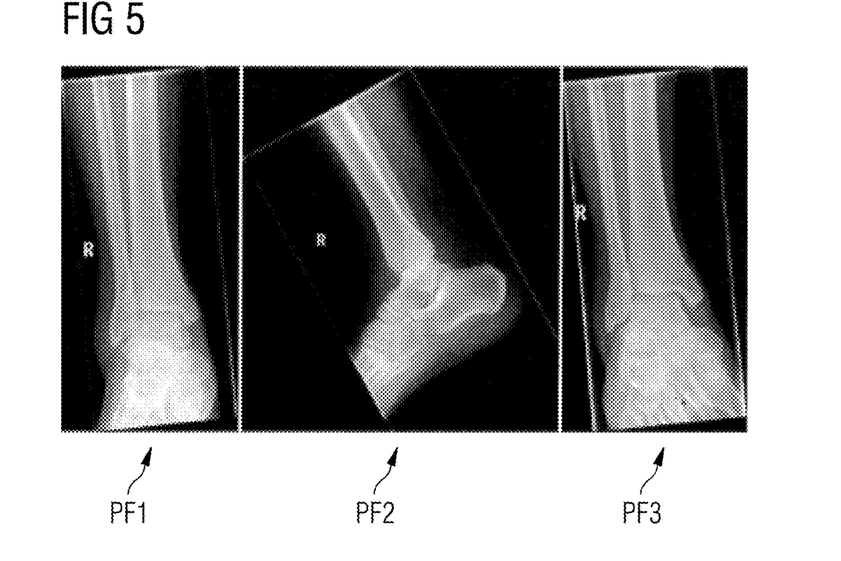
FIG. 5 is an example of three projections of an ankle in standard projection directions for a diagnostic procedure with respect to an ankle fracture.

FIG. 5 shows an example of three projections PF1, PF2, PF3 for a diagnostic procedure on an ankle, for example for the ascertainment of an injury to the ankle joint or other lesions or also simply to identify the cause of the patient's joint pain. Once again, these are usual standard projections prepared for the examination of such cases. The far left shows an anterior-posterior-projection PF1, the middle a lateral projection PF2 and the right a mortise projection PF3, i.e. a projection of the ankle mortise.

As described above in conjunction with FIG. 1, all these standard projection directions can be defined in the form of suitable projection-geometry parameters relative to a previously ascertained reference plane RE, i.e. it is only necessary for details of the desired projection directions relative to the reference plane RE found in the three-dimensional data set VB to be held resident in a kind of protocol and the ascertainment of the corresponding projection-geometry parameters PP and the calculation of the projections P to this end are then performed automatically.

Figure 6:
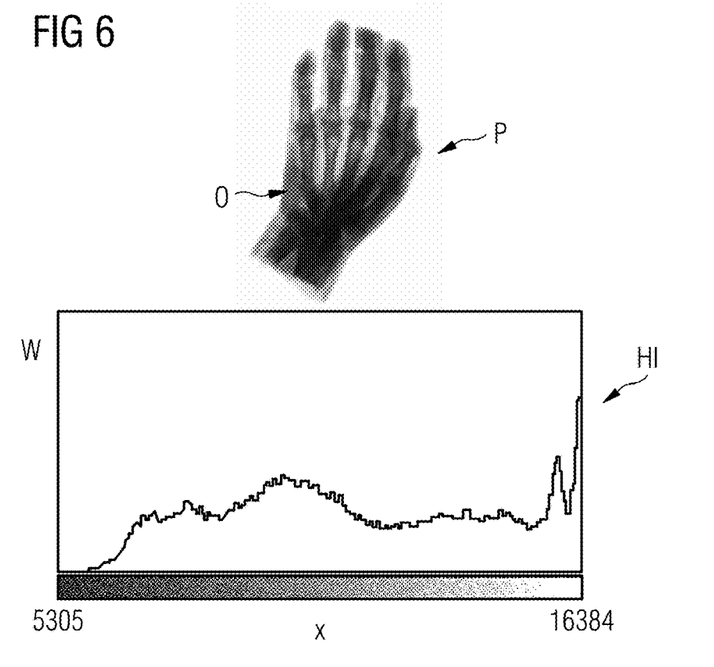
FIG. 6 is an example of a synthetic projection through an extended hand under a first projection angle and below this a histogram of the frequency of the intensity values in the projection.
Figure 7:
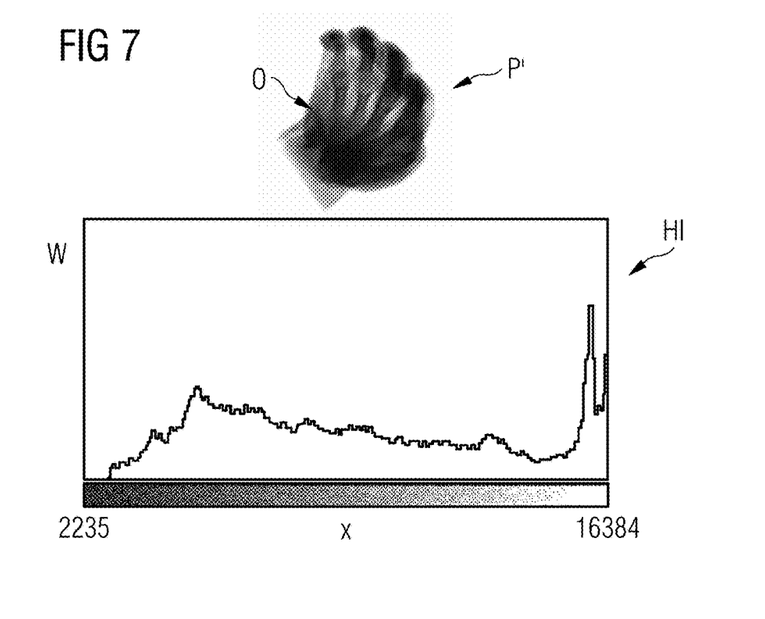
FIG. 7 is an example of a synthetic projection through the extended hand as shown in FIG. 6 but under a second projection angle and below this a histogram of the frequency of the intensity values in the projection.

FIGS. 6 and 7 now show an example of how an optimal projection P can be found even without the previous calculation of a reference plane or the like and without the specification of standard views or standard projections.

Herein, use is made of the fact that entropy can be a measure for the unpredictability of information content. FIG. 6 shows a synthetic projection P through an examination object O, here once again an extended hand O, and below this a histogram HI in which the frequency W of occurrence of intensity values x is plotted. These are the intensity values x at the individual pixels i of the image depicted above. Here, the highest intensity value (light pixels) is 16384, the lowest intensity value 5305 (arbitrary units in each case), as depicted on the bar below the histogram HI. If the entropy H is defined as:

$$H = \sum_x W(x) \cdot \log W(x), \quad (2)$$

where, as mentioned, W(x) is the relative frequency of the occurrence of the value x with all the pixels present in the image, an entropy of H=1.54 is obtained for this image in FIG. 6.

FIG. 7 also depicts a synthetic projection P' of the same hand O, but now under an angle with which the bone structures mutually overlap in the projection image and therefore the projection P' is not as suitable for use. Once again, directly below the projection P', a histogram HI is depicted, which, as in FIG. 6, indicates the frequency W of occurrence of the pixel intensity $x_i$ of the individual pixels i. A calculation of the entropy H in accordance with the above equation (2) produces for this image an entropy of H=0.88, which is lower than the entropy in the image in FIG. 6. This lower entropy is an indication that here there is a higher overlap of bone structures and hence this projection P' is not as suitable as the projection P in FIG. 6. Insofar, the entropy H can also be considered to be position information.

Based on this knowledge, it is quite simple for a plurality or series of synthetic projections to be generated based on the three-dimensional data set, the entropy to be calculated for each synthetic projection in the manner described above and then the projections with the greatest entropy to be used.

In particular, it is also possible for this method to be combined with the above-described method and for example, in Step II.5, in each case to perform the last-described method or a similar method that provides optimization by minimizing the overlap of bone structures for fine adjustment in a specific angular range about the specified standard angle or the angle specified by the user so that optimal synthetic projections are generated.

Figure 8:
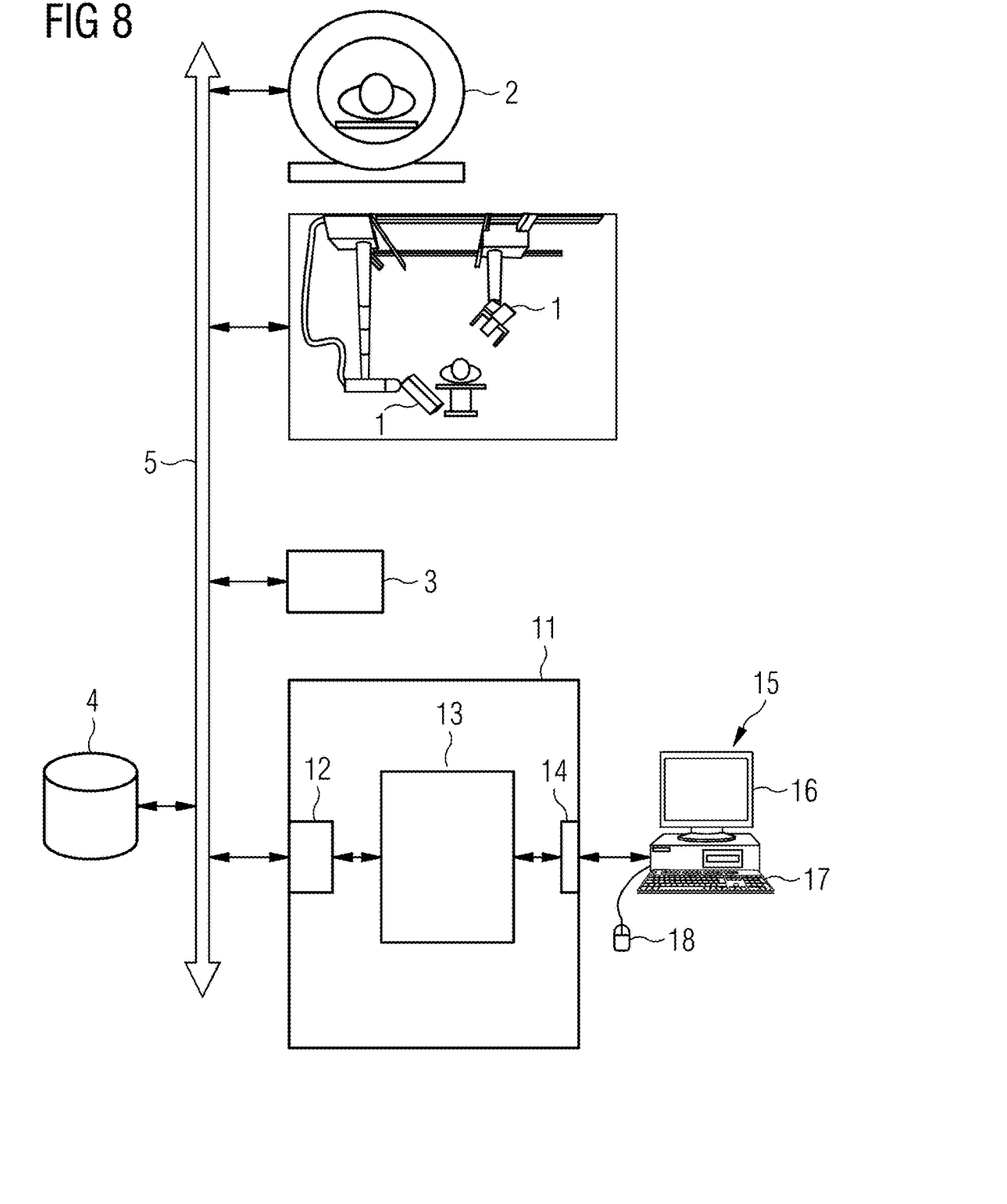
FIG. 8 is a schematic depiction of a medical data network with a plurality medical imaging systems connected thereto for the ascertainment of three-dimensional data sets and a projection-image-ascertaining facility connected thereto for the generation of synthetic projections according to an exemplary embodiment of the invention.

There now follows a description of an exemplary embodiment of a projection-image-ascertaining facility 10 according to the invention with reference to FIG. 8. FIG. 8 depicts a radiological information system with a data bus 5 to which a wide variety of devices and facilities are connected. This depicts inter alia medical imaging systems 1, 2, 3 as different devices. System 1 is a robotic X-ray scanner 1, here a Multitom Rax, a further system 2 is a computed tomography scanner 2 and the block 3 symbolizes any other system, for example a magnetic resonance tomography scanner 3 or the like.

In addition, as is generally the case, one or more mass storage devices 4 are connected to the data bus 5, wherein raw data acquired by the devices 1, 2, 3 or even already reconstructed image data, in particular the three-dimensional data sets VB, can be held resident in said mass storage device for a short-term storage or for long-term archiving.

In addition, here a projection-image-ascertaining facility 10 according to the invention is connected to the data bus 5 via an input interface 12. This input interface 12 is part of a computing unit 11 of the projection-image-ascertaining facility 10, which is connected on the other side via an output interface 14, which here is also a control interface 14, to a terminal 15. This terminal 15 comprises a screen 16 to output images and a keyboard 17 for inputting control commands and a pointing device 18, for example a mouse 18. Obviously, the screen 16 can also be embodied as a touchscreen or the like so that it can also simultaneously serve as an input means. The diagnosing practitioner can use this terminal 15 to view the three-dimensional volume image data VB and to rotate and turn it in different directions or to segment, selectively depict etc. parts of the examination object O depicted, as is usual on conventional diagnostic stations. However, it is in particular possible for the synthetic projections P depicted also to be displayed on the screen 16.

Together with the terminal 15, the computing unit 11 forms, for example, a type of workstation or diagnostic station, such as is provided in numerous radiological networks.

In the present case, the computing unit 11 is equipped with one or more suitable software modules 13 for carrying out the above-described method, i.e. in particular, for analyzing three-dimensional data sets VB obtained via the interface 12 in the described manner and to calculate synthetic projections P, which can then be displayed on the screen 16.

Finally, reference is made once again to the fact that the apparatuses and method described in detail above are only exemplary embodiments that can be modified in an variety of ways without departing from the scope of the invention. Furthermore, the use of the indefinite article "a" or "an" does not preclude the possibility that the features in question may also be present on a multiple basis. Similarly, the terms "facility", "unit" and "system" do not preclude the possibility that the components in question could comprise a plurality of interacting sub-components, which could also be spatially distributed.

The following is a summary list of reference numerals and the corresponding structure used in the above description of the invention:

1 Imaging system/X-ray scanner
2 Imaging system/computed tomography scanner
3 Imaging system/magnetic resonance imaging scanner
5 Data bus
4 Mass storage device
10 Projection-image-ascertaining facility
11 Computing unit
12 Input interface
13 Software module
14 Output interface/control interface
15 Terminal
16 Screen
17 Keyboard
18 Pointing device/mouse
DB Database
HI Histogram
K Structures/bones
LI Position information
M Midpoints
O Examination object/hand
P, P' Projections PF1, PF2, PF3 Projections
PH1, PH2, PH3, PH4 Projections
PP Projection-geometry parameters
RE Reference plane
S Segmentation
VB Three-dimensional data set/volume image data
W Frequency
x Intensity value
u, v, w Vectors
I, II, III Method steps
II.1, . . . , II.7 Method steps

The invention claimed is:

1. A method of automatically generating synthetic projections of an examination object from at least one three-dimensional data set acquired by a medical imaging system, the method comprising:
ascertaining position information relating to an arrangement of structures of the examination object based on the three-dimensional data set;
using said position information to determine at least one reference plane through the examination object; and
ascertaining at least one synthetic projection of the examination object relative to the at least one reference plane based on the position information.

2. The method according to claim 1, which comprises determining projection-geometry parameters for at least one synthetic projection based on the position information and generating the synthetic projection based on the three-dimensional data set using the projection-geometry parameters.

3. The method according to claim 1, wherein the step of ascertaining the position information comprises analyzing the three-dimensional data set with respect to a spatial arrangement of structures of the examination object.

4. The method according to claim 3, wherein the step of analyzing the three-dimensional data set comprises ascertaining significant anatomic features of the examination object.

5. The method according to claim 4, wherein the significant anatomic features of the examination object are anatomic landmarks.

6. The method according to claim 1, which comprises segmenting the three-dimensional data set.

7. The method according to claim 1, which comprises ascertaining projection-geometry parameters so that the synthetic projection has a defined orientation with respect to the reference plane.

8. The method according to claim 1, which comprises generating a plurality of synthetic projections and ascertaining therefrom position information on at least one synthetic projection optimized with respect to specific optimization criteria.

9. The method according to claim 8, which comprises ascertaining in each case position information from the synthetic projections with reference to a determination of an entropy of pixel values.

10. The method according to claim 8, which comprises ascertaining in each case position information from the synthetic projections with reference to edges of the structures.

11. The method according to claim 8, which comprises ascertaining in each case position information from the synthetic projections with reference to a projection surface of the structures.

12. The method according to claim 1, which comprises using different three-dimensional data sets of the examination object acquired in different positions of the examination object.

13. The method according to claim 1, which comprises ascertaining preferred projection-geometry parameters with the aid of a machine learning method.

14. The method according to claim 13, which comprises ascertaining a preferred orientation with respect to a reference plane.

15. The method according to claim 13, wherein the machine learning method is based on a database.

16. A computer program product, comprising: a non-transitory computer-readable medium storing computer-readable program code configured to cause a computing unit, forming a data-processing arrangement, to carry out the method according to claim 1 when the program code is executed on the computing unit.

17. The computer program product according to claim 16, wherein the computing unit is a computing unit of a projection-image-ascertaining facility for the automatic generation of synthetic projections of an examination object.

18. The method of claim 1, wherein a fit method is used to adapt the at least one reference plane to the position information.

19. A projection-image-ascertaining facility for the automatic generation of synthetic projections of an examination object from at least one three-dimensional data set acquired by way of a medical imaging system, the projection-image-ascertaining facility comprising:
an input interface for receiving the three-dimensional data set;
a computing unit configured for ascertaining position information relating to an arrangement of structures of the examination object based on the three-dimensional data set, for determining at least one reference plane through the examination object using said position information, and for ascertaining at least one synthetic projection of the examination object with respect to the at least one reference plane based on the position information; and
an output interface for outputting the synthetic projection.

20. A computer-readable medium, comprising program segments stored in non-transitory form and configured to be read and executed by a computing unit, said program segments being configured to carry out all steps of the method according to claim 1 when the program segments are executed by the computing unit.

* * * * *